United States Patent [19]

Holler et al.

[11] Patent Number: 5,087,826
[45] Date of Patent: Feb. 11, 1992

[54] MULTI-LAYER NEURAL NETWORK EMPLOYING MULTIPLEXED OUTPUT NEURONS

[75] Inventors: Mark A. Holler, Palo Alto; Simon M. Tam, Redwood City, both of Calif.

[73] Assignee: Intel Corporation, Santa Clara, Calif.

[21] Appl. No.: 635,231

[22] Filed: Dec. 28, 1990

[51] Int. Cl.⁵ .............................................. G06C 7/12
[52] U.S. Cl. .................................. 307/201; 307/243; 395/24
[58] Field of Search .......................... 395/24; 364/807; 307/201, 443, 243

[56] References Cited

U.S. PATENT DOCUMENTS

| | | | |
|---|---|---|---|
| 4,760,346 | 7/1988 | Kultgen et al. | 307/243 X |
| 4,873,661 | 10/1989 | Tsividis | 364/807 |
| 4,926,064 | 5/1990 | Tapang | 307/201 |
| 4,951,239 | 8/1990 | Andes et al. | 364/807 |
| 4,972,157 | 11/1990 | Mayal | 307/243 X |
| 4,972,363 | 11/1990 | Nguyen et al. | 364/807 |
| 4,985,703 | 1/1991 | Kaneyama | 307/243 X |
| 5,039,871 | 8/1991 | Engeler | 307/201 |

OTHER PUBLICATIONS

Hopfield & Tank, "Computing with Neural Networks: A Model" *Science*, vol. 233, pp. 625–633, Aug. 1986.
Graf & Jackel, "Analog Electronic Neural Network Circuits" *IEEE Circuits & Devices*, Jul. 1989, pp. 44–50.
"Time-Multiplicated Analogue Circuit For Implementing Artificial Neural Networks", *Electronics Letters*, vol. 24, No. 23, Nov. 1988, pp. 1413–1414.

*Primary Examiner*—David Hudspeth
*Attorney, Agent, or Firm*—Blakely, Sokoloff, Taylor & Zafman

[57] ABSTRACT

A multi-layer electrically trainable analog neural network employing multiplexed output neurons having inputs organized into two groups, external and recurrent (i.e., feedback). Each layer of the network comprises a matrix of synapse cells which implement a matrix multiplication between an input vector and a weight matrix. In normal operation, an external input vector coupled to the first synaptic array generates a Sigmoid response at the output of a set of neurons. This output is then fed back to the next and subsequent layers of the network as a recurrent input vector. The output of second layer processing is generated by the same neurons used in first layer processing. Thus, the neural network of the present invention can handle N-layer operation by using recurrent connections and a single set of multiplexed output neurons.

10 Claims, 4 Drawing Sheets

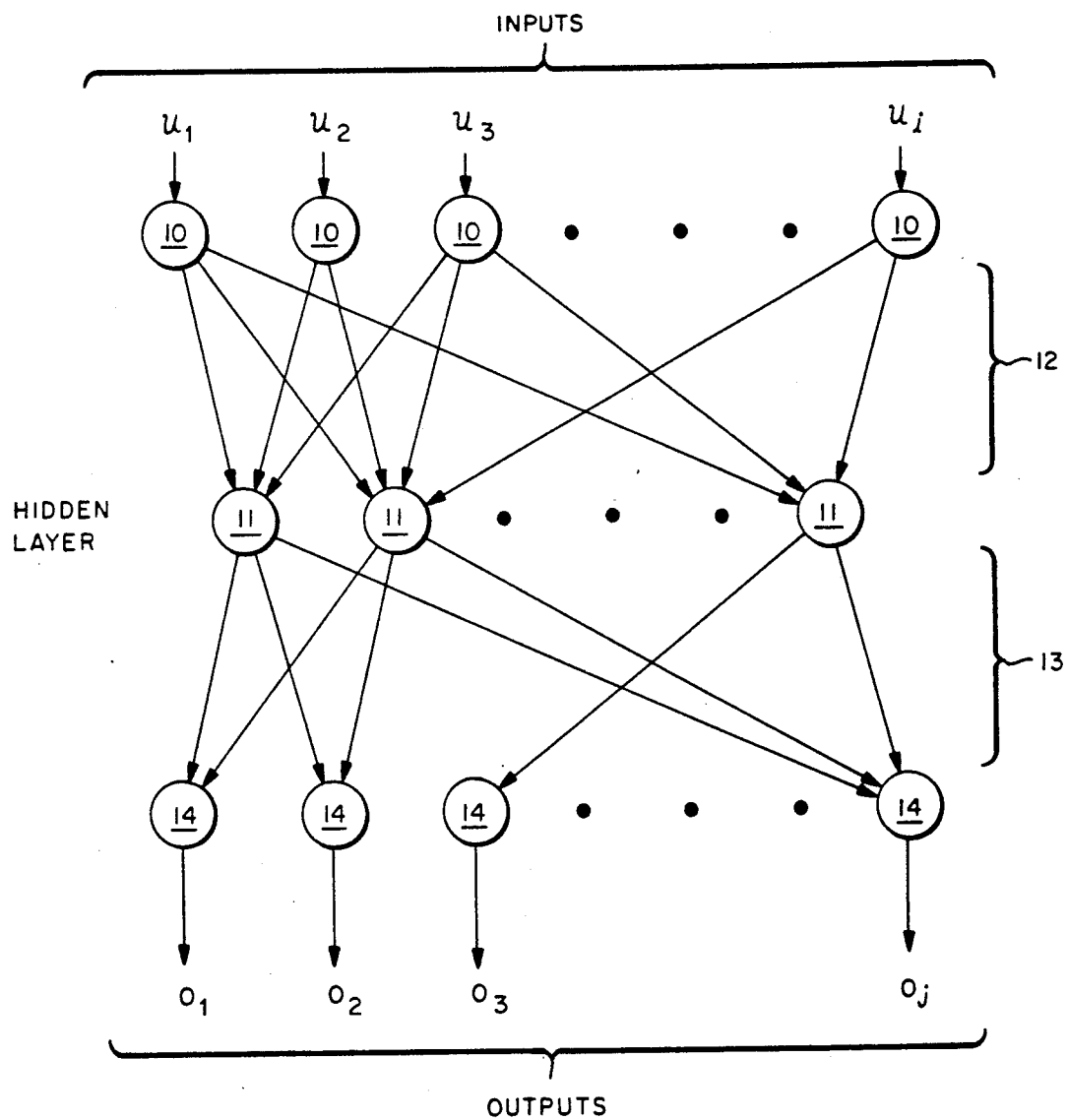
FIG _ 1 (PRIOR ART)

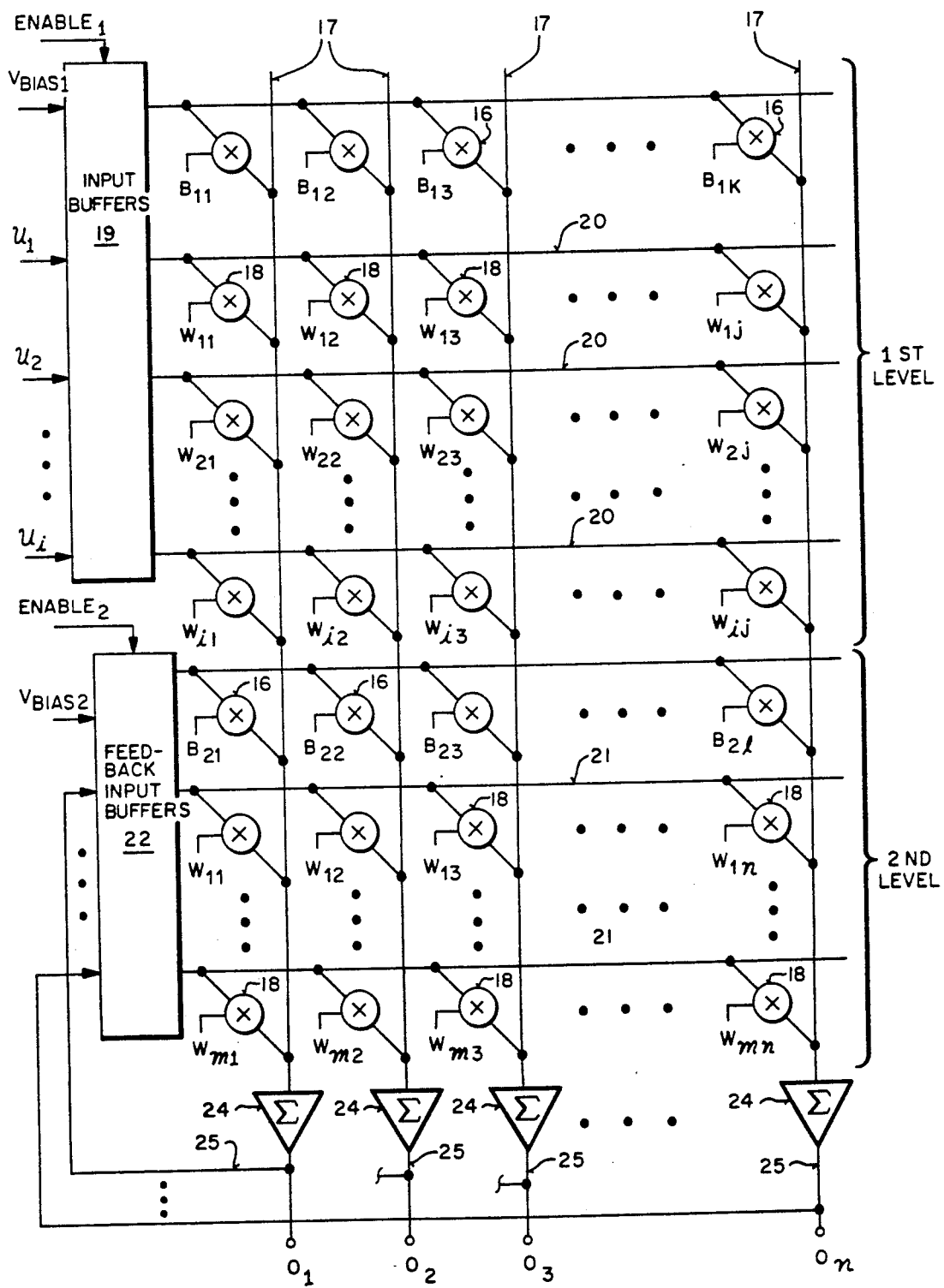

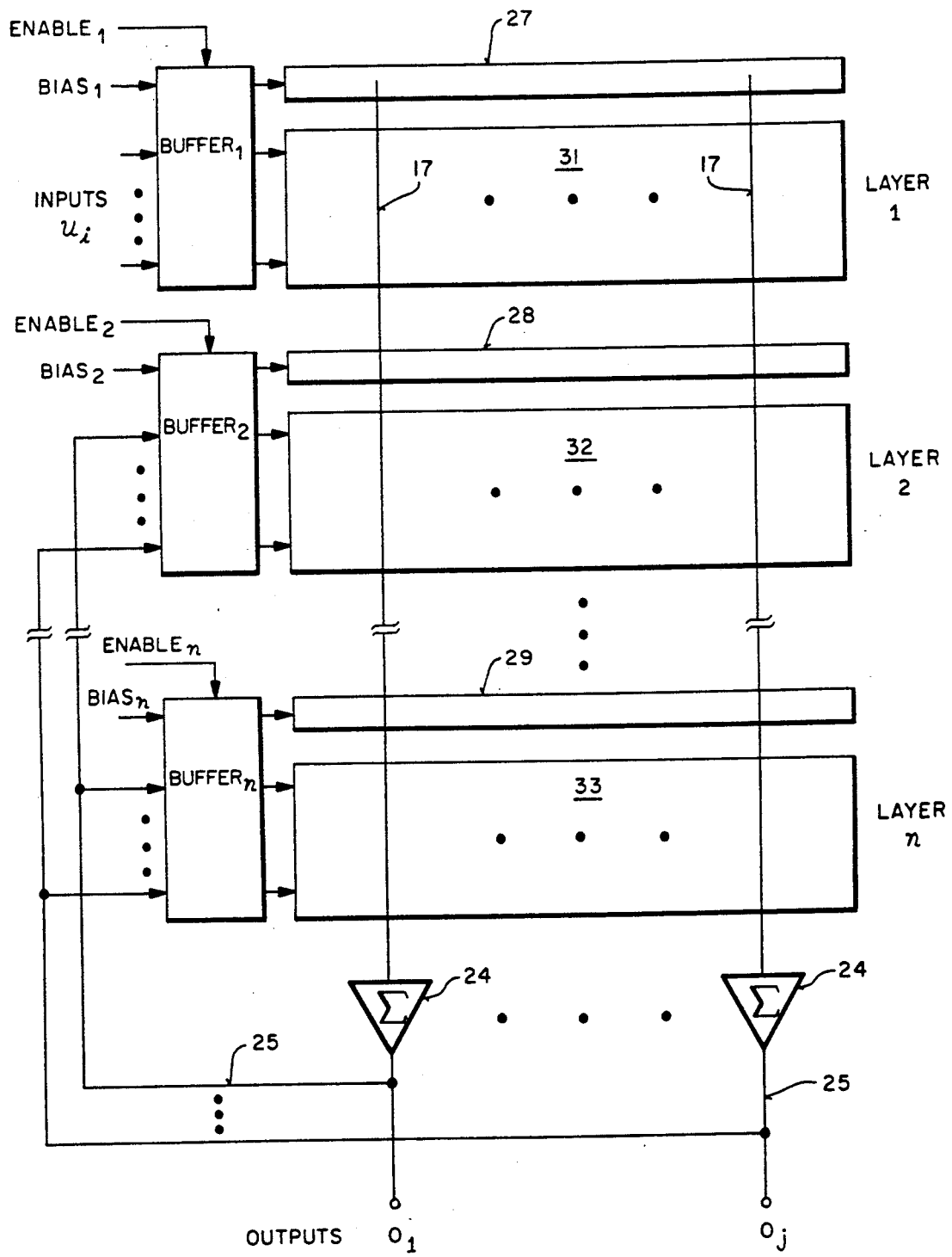
FIG_3

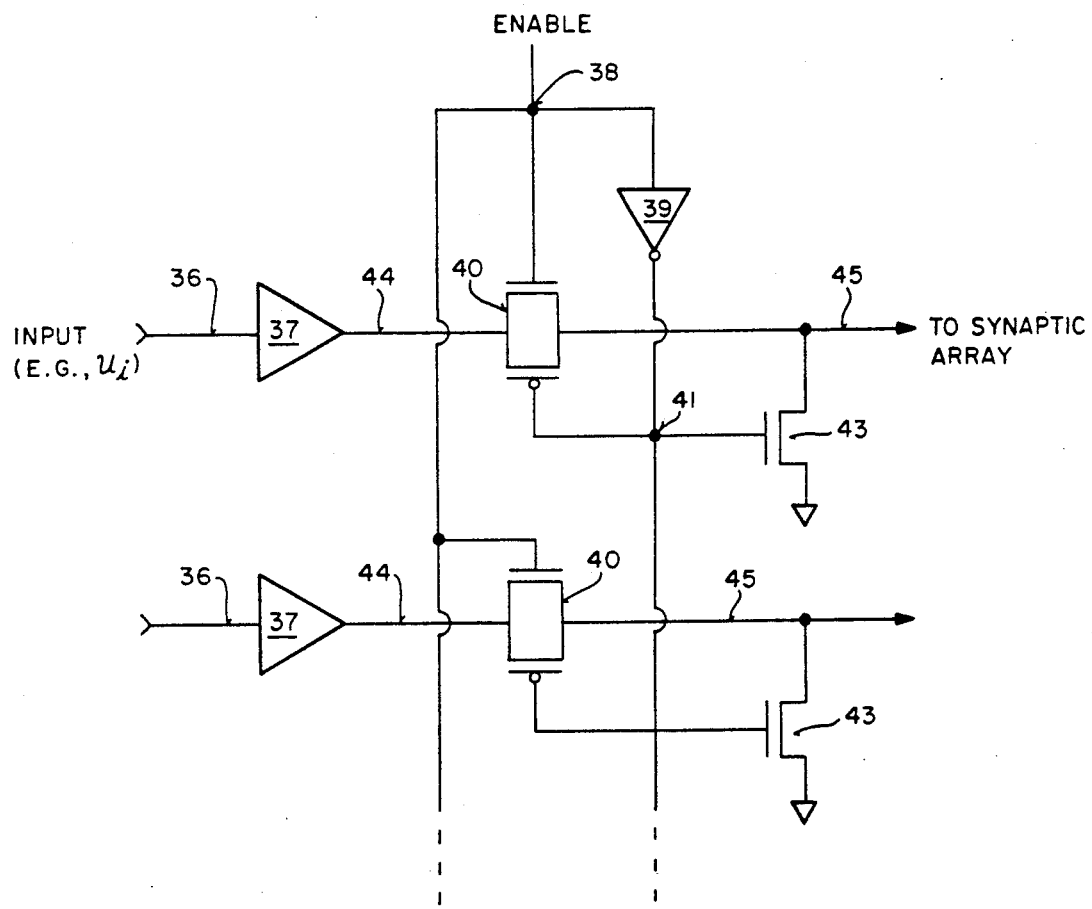

MULTI-LAYER NEURAL NETWORK EMPLOYING MULTIPLEXED OUTPUT NEURONS

FIELD OF THE INVENTION

The present invention relates to the field of electrical networks aimed at emulating the function of the cortex of the human brain. More particularly, the invention relates to multi-layer networks for solving the problems which are non-linear in nature.

BACKGROUND OF THE INVENTION

Neural networks are a class of electronic circuits which emulate higher-order brain functions such as memory, learning and/or perception/recognition. These networks basically adopt a parallel approach to problem solving in which pattern recognition and mapping problems can be solved in thousandths of the time required by a conventional Von-Neuman computer with its single-instruction cycle times. For an introduction to the field of artificial neural networks, reference may be made to an article by Richard P. Lippmann entitled "An Introduction To Computing With Neural Nets", published in IEEE ASSP Magazine, April 1987. That article describes commonly used networks and simple neuron-like components.

In its simplest form, a neural network generally takes the form of a matrix comprising a set of horizontal lines which cross and contact a set of vertical lines. The horizontal lines simulate the function of axons in the cortex of the brain and are used as inputs. The vertical lines simulate the function of dendrites extending from neurons. Each vertical line terminates at a voltage summing device which acts to simulate the function of the neural cell body. These networks are frequently referred to as single layer perceptrons, and have been developed for their ability to learn to recognize simple patterns. Examples of such networks and their computational elements are disclosed in U.S. Pat. Nos. 4,950,917; 4,904,881; 4,956,564; and 4,961,002, all of which are assigned to the assignee of the present application.

In order to solve problems that are not linearly dependent, or not linearly separable, a multi-layer neural network (i.e., a multi-layer perceptron) is required. Multi-layer networks overcome many of the limitations of single-layer networks by including additional layers containing hidden units or nodes that are not directly connected to both the input and output nodes. By way of example, a multi-layer neural network is disclosed in U.S. Pat. No. 4,906,865, which is also assigned to the assignee of the present invention. The number of layers in the network is directly related to the complexity of the problem which the net is capable of solving. For instance, a three-layer perceptron is capable of generating arbitrarily complex decision regions.

In the past, one of the main drawbacks of multi-layer perceptrons has been that each of the nodes associated with the additional layers includes a a corresponding set of neurons. These neurons usually consist of summing and Sigmoid functions. However, because the electrical implementations of neurons tend to be very area intensive, multi-layer networks have proven inefficient and costly to build. Therefore, what is needed is a means of implementing a multi-layer neural network employing a minimum number of neurons.

SUMMARY OF THE INVENTION

A multi-layer electrically trainable analog neural network employing multiplexed output neurons is described. The network processes inputs which are organized into two groups, external and recurrent (i.e., feedback). Each layer of the network comprises a matrix of synapse cells organized into an array. The synapse cells themselves comprise floating gate devices in which the electrical charge level present on the floating gates represents the stored weight of the synaptic array. In this manner, each layer of the network implements the inner product of an input vector (either external or recurrent) and a stored weight vector. More precisely, each layer of the network implements a matrix multiplication between an input vector and a weight matrix; each element of the outcome being a "dot" product of the input vector and a weight vector.

Each of the synaptic layers of the network is coupled to a plurality of neurons which produces a Sigmoid output, or "neural response" derived from the processing associated with any one or all of the layers. That is, the output neurons are multiplexed with each of the synaptic layers such that the neurons are effectively reused to compute the total dot product for each layer. In normal operation, processing is performed sequentially on a layer-by-layer basis. This means that the external input vector coupled to the first synaptic array first generates a Sigmoid response at the output of the set of neurons. This output is then fed back to the next and subsequent layers of the network as a recurrent input vector.

Once the neural outputs have been fed back as recurrent inputs to the subsequent (e.g., second) layer in the network, processing on the subsequent layer may begin. The output of the second layer processing is generated by the same neurons used in first layer processing. To prevent the external input vector to the network from interfering with subsequent layer processing, these inputs are effectively disconnected from the array by the disconnection and the disabling of the input buffers and, subsequently, the input lines.

Each layer of the network includes a fixed-bias synapse array that stores additional fixed-bias weights. Changing bias unit weights alters the sum of currents generated in the dendrites of each synaptic layer, thereby shifting the neuron threshold. Thus, the neural network of the present invention can handle N-layer operation by using recurrent connections and a single set of multiplexed output neurons.

BRIEF DESCRIPTION OF THE DRAWINGS

FIG. 1 illustrates a prior art multi-layer perceptron including a layer of hidden units.

FIG. 2 is a schematic diagram of the currently preferred embodiment of the present invention.

FIG. 3 illustrates how the multi-layer perceptron of the present invention can be expanded to N separate layers.

FIG. 4 illustrates a circuit schematic of one embodiment of the buffers of FIGS. 2 and 3.

DESCRIPTION OF THE PREFERRED EMBODIMENT(S)

A scheme for multiplexing output neurons in a distributed parallel processing system is described. In the following description, numerous specific details are set forth, such as the number of layers, connections, device types, etc., in order to provide a thorough understanding of the present invention. It will be obvious, however, to one skilled in the art, that the present invention may be practiced without these specific details. In other instances, well-known structures such as neural amplifiers and synapse cells have not been set forth in detail in order to avoid unnecessarily obscuring the present invention.

DISCUSSION OF THE PRIOR ART

Referring to FIG. 1, there is shown a conventional multi-layer perceptron in which an input vector $u_i$ is applied to a set of input nodes 10. These nodes are selectively connected by a plurality of lines 12 to a second set of nodes 11 which comprise the hidden layer of the network. Each line 12 corresponds to a value in the synaptic array. Note also that each of the nodes 11 in FIG. 1 includes a neural summing device or neuron, which is commonly implemented electrically using an operational amplifier. As was previously discussed, operational amplifiers occupy a large area and thereby greatly increase the overall size and cost of the network.

Hidden layer nodes 11 are likewise connected to a second set of nodes 14 through lines 13. Nodes 14 also include neural summing devices whose response represents a Sigmoid function output $O_j$.

The primary problem with the prior art network of FIG. 1 is that each layer of the multi-layer perceptron requires a set of dedicated output neurons. For a very large array having multiple layers, the area occupied by these neurons becomes prohibitively large. This is especially so when the network is implemented as an integrated circuit. Thus, the multi-layer neural network of FIG. 1 is characterized by its inefficiency.

DISCUSSION OF THE PRESENT INVENTION

With reference now to FIG. 2, there is shown the currently preferred embodiment of the present invention, in which an input vector $u_i$ and a bias input $V_{BIAS1}$ is coupled through input buffer 19 to a corresponding plurality of horizontal lines 20. Lines 20 comprise the axons of the array. Every horizontal line 20 is selectively connected to a vertical dendrite line 17 through a synapse cell 18. Synapse cells 18 collectively store a weight vector $W_{ij}$. Each of the vertical lines 17 is shown terminating at a neural summing device 24. Devices 24 sum the current flowing along lines 17 and produce a voltage output that is fed back to the next layer along lines 25. Lines 25 are coupled to horizontal lines 21 associated with the second layer of the network through feedback buffers 22.

Note that associated with each level or layer of the multi-layer network of FIG. 2 is a bias input voltage term, $V_{BIAS}$, which is similarly coupled the through a set of additional synapse cells 16 to each of lines 17 in the network. By way of example, the first level of the network shown in FIG. 2 includes an input voltage $V_{BIAS1}$ coupled to the array through synapse cells 16 which store fixed-bias weights $B_{11}, B_{12}, \ldots, B_{1k}$. Synapse cells 16 are identical to cells 18 in every way; that is, cells 16 implement a multiplication between the input bias term $V_{BIAS1}$ and a set of fixed-bias weights (i.e., $B_{1k}$). Also note that input bias voltage is buffered by buffers 19.

Likewise, the second level of the neural network includes an input voltage term $V_{BIAS2}$ that is coupled to dendrites 17 through synapses 16 which store fixed-bias weights $B_{21}, B_{22}, \ldots, B_{2l}$. Each of these bias terms represents a fixed value when the associated layer of the network is active. When the associated input buffer units 22 are disabled (via control signal $ENABLE_2$), both the bias and the recurrent inputs present on lines 25 are disconnected from the network array. This effectively turns off the second level or layer of the network so that the feedback inputs no longer contribute current along lines 17 coupled to neurons 24.

The same is true of the first layer of the network, i.e., during second layer processing, the control signal $ENABLE_1$ is used to disable the first level inputs from the array. This aspect of the present invention will be discussed in more detail shortly.

Normal operation of the network of FIG. 2 is best described as parallel distributed processing in which each of the neurons 24 implements the following function:

$$\text{Output}(O_n) = \text{Sigmoid}[\Sigma(\text{Weight}(W_{ij})^* \text{Input}(U_j)) + \Sigma(B_k^* V_{BIAS})]$$

This calculation is a "dot product" or "inner product" operation which is subsequently "compressed" by a Sigmoidal transfer characteristic. In other words, the dot product of an input vector $u_i$ with a stored weight vector $W_{ij}$ equals the product of their lengths times the cosine of the angle between them. This yields a single, scalar quantity which is correlated to how closely the two vectors match. A vector pair will have the largest dot product when the angle between them is smallest (e.g., best match). In the network of FIG. 2, each of the individual neurons 24 independently "dot" one or both of the input and/or recurrent vectors with the corresponding weight matrices. (Of course, there are also additional fixed-bias weights associated with each level of the network).

In the neural network of FIG. 2, each of the synapses 18 store weights as analog transconductance values, each producing an analog output current from an analog input voltage and a stored weight voltage. Currently, cells 18 comprise an ordinary EEPROM cell pair synapse implementation, although other types of synapse cells can also be employed. Currents generated by each of the synapses connected along a single dendrite 17 are summed to form the net input to a neuron body 24. The dendrite's "sum of currents" is then converted to a voltage by neuron 24 which generates the Sigmoid function output. When both of input and feedback arrays are active, the neural output provided along lines 25 corresponds to the sum of the two dot products.

Note that the Sigmoid is a "threshold" function where dot products below the neuron's output threshold indicates a poor match between the input and stored weight vectors. Conversely, the neuron output is high for dot products above the neuron's threshold. Of course, a neuron's threshold can be changed independently by the learning algorithm applied to the network. This allows a different match criteria for different vectors. Changing bias unit weights alters the sum of currents, thereby shifting the neuron threshold.

In the configuration of FIG. 2, neural outputs provided on lines 25 are coupled through feedback buffers 22 to the second set of horizontal lines 21. Feedback buffers 22 typically comprises ordinary storage devices, but may also include a sample and hold function for sequential operation of the neural network. Speech recognition is one application where this feature is particularly useful since input data is gathered from different points in time. A neural network employing a sample and hold feedback architecture is described in U.S. Pat. No. 4,906,865.

FIG. 4 illustrates one embodiment of buffers 19 and 22 that can be employed within the network of the present invention. In the buffer of FIG. 4, individual inputs are coupled along input line 36 to an ordinary buffer 37 having an output on line 44. Line 44, in turn, is coupled to simple analog switch 40, which comprises a pair of parallel-coupled field-effect devices (i.e., a p-channel and an n-channel transistor). The gate of the n-channel transistor is connected to node 38, while the gate of the p-channel transistor is connected to node 41. Node 41 is also connected to the gate of an ordinary n-channel MOS transistor 43. The source and drain regions of transistor 43 are connected between ground and line 45. Line 45 represents the output of analog switch 40. The buffer structure described above is repeated for every corresponding input or bias term associated with that particular level of the network.

The operation of the buffer of FIG. 4 is straightforward. The ENABLE signal coupled to node 38 controls whether the input voltage present on line 36 is passed through to line 45, connected to the synaptic array. When ENABLE is "high" (e.g., 5V), inverter 39 produces a "low" (e.g., 0V) voltage at node 41. This turns off device 43 and closes switch 40, thereby coupling the input voltage directly to the array. Whenever ENABLE is low, the opposite condition occurs; namely, switch 40 is opened and device 43 is turned on, thereby forcing lines 45 to ground. Thus, the ENABLE$_1$ and ENABLE$_2$ control signals are used in the network of the present invention to effectively disconnect either the external or recurrent inputs from their associated layer of the network.

In a typical multi-layer processing session, the external input vector $u_i$ is initially applied to the first level synapse array. During this time, the second level array is essentially disabled by disabling the feedback buffers 22, as described above. The resultant Sigmoid function output appears on lines 25. This output corresponds to a multiplication of the input vector $u_i$ with the stored weight vector $W_{ij}$ at the first level of the network. This output also represents the feedback or recurrent input to the second level synapse array.

Once the recurrent input has been stored in feedback buffers 22, the first level array is shut down by disabling the input buffers 19 (e.g., ENABLE$_1$ = 0V). During this time the second level of the array is activated by enabling feedback buffers 22 (e.g., ENABLE$_2$ = 5V). Now, second level processing can begin with the recurrent input vector present on lines 21 being multiplied by the stored weight vector $W_{mn}$. Following second layer processing, the output of neurons 24 represents the total dot product of the network.

Thus, the single electrically trainable analog neural network of FIG. 2 can handle 2-layer operation by using recurrent connections and multiplexed neurons. To reiterate, during first layer processing the output of neurons 24 reflects a matrix multiply of an input vector times the weight vector stored in the first level of the synapse array. Once second-layer processing begins, the neuron outputs are fed back as recurrent inputs to the second level array. To prevent the external inputs to the network from interfering with second layer processing, the external inputs are effectively disconnected from the array by means of disabling the input buffers 19.

It is appreciated that the feedback capability of the present invention supports a variety of networks, including Hopfield network implementations.

With reference now to FIG. 3, there is shown an N-layer neural network employing recurrent inputs and multiplexed neurons. FIG. 3 illustrates how the basic concept of the present invention may be expanded to a network having more than two layers. By way of example, the first layer synapse array 31 of FIG. 3 is shown receiving inputs $u_i$ and generating a sum of currents along dendrites 17. The sum of currents is coupled to the inputs of neurons 24. Also associated with synapse array 31 is a fixed-biased weight array 27.

The remaining layers are constructed in a manner similar to that of FIG. 2; that is, the recurrent inputs to synapse layer 32 (having an associated fixed-bias array 28) are represented by the outputs of neurons 24 fed back along lines 25. Normally, the neural response present on lines 25 is the result of the previous layer (i.e., layer 1) processing. As is typically the case with sequential layer processing, when one layer of the network is activated, all other layers of the network are effectively shut off by appropriately disabling the corresponding inputs controlled by signals ENABLE$_{1-N}$ and buffers 1-N.

For instance, during second layer processing the first layer synapse array is disabled along with layers 3 through N. As before, once second layer processing is finished, that layer (i.e., layer 2) is disabled and the next layer in the sequence is activated to receive the recurrent inputs provided by neurons 24 along feedback lines 25.

Although the present invention has been described into conjunction with one specific embodiment, it is appreciated that the present invention may be implemented in a variety of other ways. Consequently, it is to be understood that the particular embodiments shown and described by way of illustration are in no way intended to be considered limiting. The reference to the details of the preferred embodiment are not intended to limit the scope of the claims which themselves recite only those features regarded as essential to the invention.

What is claimed is:

1. A multi-layer electrically trainable neural network comprising:
    a first synaptic layer for multiplying an input vector with a first stored weight;
    a second synaptic layer for multiplying a recurrent vector with a second stored weight;
    a plurality of neurons deriving Sigmoid output from either or both of said synaptic layers;
    means for multiplexing said neurons between said first and second synaptic layers.

2. The network of claim 1 wherein each of said synaptic layers stores their respective weights as an analog transconductance value and each produces an analog output current summed along dendrites coupled to said neurons.

3. The network of claim 2 wherein said multiplexing means comprises:
    a first buffer means for buffering said input vector; a second buffer means for buffering said recurrent vector;
    control means for controlling said first and second buffers to decouple said input vector from said first synaptic layer during second layer processing, and to decouple said recurrent vector during first layer processing.

4. The network of claim 3 further comprising:
a first fixed-bias weight array associated with said first synaptic layer for altering the sum of currents generated by said first synaptic layer;
a second fixed-bias weight array associated with said second layer for altering the sum of currents generated by said second layer.

5. A parallel distributed processing system for correlating the match between two or more vectors comprising:
an input synapse array for computing the inner product of an input vector and a first stored weight vector as a sum of currents;
a feedback synapse array for computing the inner product of a recurrent vector and a second stored weight vector as a sum of currents;
a plurality of neurons implementing a Sigmoid function;
means for sequentially multiplexing said neurons between said input and feedback arrays such that said neurons first operate on the sum of currents generated by said input array to produce said recurrent vector, after which time said neurons then operate on the sum of currents generated by said feedback array.

6. The system of claim 5 wherein said multiplexing means comprises:
a first buffer means for buffering said input vector from said input synapse array;
a second buffer means for buffering said recurrent vector from feedback synapse array;
control means for controlling said first and second buffer means to decouple said recurrent vector from said feedback array during first layer processing, and to decouple said input vector from said input array during second layer processing.

7. The system of claim 6 further comprising a first fixed-bias weight array associated with said input synapse array for altering the sum of currents generated by said input array, and a second fixed-bias weight array associated with said feedback synapse array for altering the sum of currents generated by said feedback array.

8. The system of claim 7 wherein said input and feedback arrays each comprise an array of electrically programmable floating gate devices which store said first and second weights in the form of electrical charges.

9. An N-layer electrically trainable analog neural network in which inputs are organized into two groups, external and recurrent, each layer containing a synaptic array storing a weight vector and an associated fixed-bias weight, said fixed-bias weight altering the sum of currents generated along the dendrites of each array, said sum of currents representing the dot product between either of said external or recurrent inputs and said stored weight, said network also including a set of neurons for computing the overall dot product associated with each layer and a means for multiplexing use of said neurons during processing beginning with the first layer and proceeding sequentially through the $N^{th}$ layer, wherein processing associated with a given layer proceeds independent of the inputs applied to other layers of said network, the neural response associated with said given layer being provided as the recurrent input to the next layer to be processed in said sequence.

10. The network of claim 9 wherein said multiplexing means comprises a plurality of input buffers associated with each said layer of said network, said buffers being controlled to selectively disable said external and/or recurrent inputs in accordance with said processing sequence.

* * * * *